United States Patent
Suzuki et al.

(10) Patent No.: US 7,131,721 B2
(45) Date of Patent: Nov. 7, 2006

(54) INK JET RECORDING METHOD

(75) Inventors: Shinichi Suzuki, Saitama (JP); Shuji Kida, Iruma (JP); Hidenobu Ohya, Hachioji (JP); Makoto Kaga, Hachioji (JP); Teruyuki Fukuda, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 322 days.

(21) Appl. No.: 10/723,663

(22) Filed: Nov. 24, 2003

(65) Prior Publication Data

US 2004/0109052 A1 Jun. 10, 2004

(30) Foreign Application Priority Data

Dec. 6, 2002 (JP) ............................. 2002-354944

(51) Int. Cl.
*B41J 2/01* (2006.01)

(52) U.S. Cl. ...................... 347/100; 347/101; 347/105

(58) Field of Classification Search ................ 347/100, 347/101, 95, 96, 105; 428/195, 32.1; 106/31.6, 106/31.27, 31.13; 523/160
See application file for complete search history.

(56) References Cited

U.S. PATENT DOCUMENTS

| | | | | |
|---|---|---|---|---|
| 5,764,261 A | * | 6/1998 | Koike et al. | 347/100 |
| 5,814,685 A | * | 9/1998 | Satake et al. | 347/100 |
| 6,239,193 B1 | * | 5/2001 | Cheng et al. | 523/160 |
| 6,511,736 B1 | * | 1/2003 | Asano et al. | 428/206 |

FOREIGN PATENT DOCUMENTS

EP        1016542 A1  *  7/2000

* cited by examiner

*Primary Examiner*—Manish S. Shah
(74) *Attorney, Agent, or Firm*—Frishauf, Holtz, Goodman & Chick, P.C.

(57) ABSTRACT

A method for printing an ink-jet image, including the step of: ejecting droplets of an ink on an ink-jet recording media, wherein the ink contains nonionic resinous micro-particles, a water-soluble dye, water and an organic solvent; and the ink-jet recording media contains a support having thereon at least one ink absorbing layer and the outermost layer of the ink-jet recording media contains a porous structure containing a cationic polymer and inorganic pigment micro-particles.

1 Claim, No Drawings

INK JET RECORDING METHOD

TECHNICAL FIELD

The present invention relates to a novel ink jet recording method, and in more detail to an ink jet recording method which results in excellent gas fading resistance, higher glossiness, and excellent bleeding resistance.

BACKGROUND

Ink jet recording is carried out in such a manner that minute ink droplets are ejected, employing various working principles and are deposited onto a recording sheet to achieve recording of images and text. The aforesaid ink jet recording exhibits advantages such as relatively high speed, low noise, and easy application to multicolor formation.

Particularly, recently, printers have been improved to produce high image quality approaching conventional photographic quality. As a result, recording sheets are also required to mimic photographic quality as well as to result in reproduction of the feel (such as glossiness, smoothness, and stiffness) of conventional silver salt photography. However, problems still remain with regard to lightfastness, waterfastness and moisture resistance.

In order to overcome problems due to the use of the aforesaid water-soluble dye ink, a method has been known in which, for improvement of waterfastness or lightfastness, resinous micro-particles (being a latex) are incorporated into water-soluble dye ink so that the printed portions are covered (for example, refer to Patent Documents 1–4).

On the other hand, as one of the methods for reproducing the feel of silver salt photography, known is a method which employs a so-called swelling type recording sheet which is prepared by applying hydrophilic binders such as gelatin or polyvinyl alcohol onto a support. However, the aforesaid method causes problems in which the rate of ink absorption is low, the surface tends to be sticky after printing, and images tend to bleed while affected by humidity during storage. Specifically, due to the low rate of ink absorption, ink droplets mix with each other to tend to result in bleeding between different colors as well as beading between the same color due to mixing of ink droplets prior to absorption, whereby it is extremely difficult to achieve the desired silver salt photographic quality.

In order to overcome the aforesaid problems, so-called void type recording sheets have played a main role while replacing the aforesaid swelling type recording sheets. Void type recording sheets are characterized in their high rate of ink absorption due to the absorption of ink into micro-voids. However, when the void type ink jet recording media (hereinafter also referred to simply as recording media) capable of achieving higher image quality and a water-soluble dye ink are combined, image fading, due to gases in the storage ambience, has been realized as a great problem. Image fading mechanism due to the aforesaid gases is not yet completely understood. However, it is assumed to be as follows. Gases in a storage ambience, especially oxidizing gases easily reach, via the void structure, dyes which have penetrated into a void type ink jet recording medium and decompose dye molecules, resulting image fading.

In order to minimize fading due to such oxidizing gases, it is possible to use a method in which after printing images on a recording medium, the resulting surface is subjected to a lamination treatment, or an image printed recording medium is stored in a frame capable of shielding from such gases. However, each of these methods necessitates post-treatment. As a result, processing becomes more complex and induces an increase in cost due to additional preparation of apparatuses for that.

In order to overcome such drawbacks, it is proposed that by printing on a recording medium employing a water-soluble dye ink comprised of resinous micro-particles, such particles remain on the surface of the aforesaid recording medium and subsequently is subjected to film formation which serves as a gas barrier, whereby the penetration of oxidizing gases into the aforesaid recording medium is minimized (refer, for example, to Patent Document 5). Film formation, as described herein, refers to a process in such a manner that the void structure portion of the uppermost surface of the recording media is filled with resinous micro-particles and immediately, the resulting resinous micro-particles are fuse with each other. Further, by achieving the film formation on the uppermost layer, surface roughness of the recording medium varies between prior to and after the deposition of ink droplets, resulting in more smoothness after printing.

In the aforesaid method, specifically when silica micro-particles are employed as inorganic micro-particles which form the void structure, the aforesaid silica particles exist together with cationic binders in the form of micro-particles and contribute to achieve compatibility between bleeding resistance and high glossiness. However, in the aforesaid constitution, electric properties of micro-particles incorporated into ink largely affect the layer properties. Namely, when ink comprised of anionic micro-particles is printed on the highly cationic surface of the recording medium, anionic micro-particles tend to aggregate on the surface of the recording medium, whereby glossiness is degraded due to formation of a roughness structure.

The above-described aggregation may affect ink absorption property resulting in deterioration of ink absorption.

Further, when image recording is achieved employing a water-soluble dye ink, problems occur during storage in which bleeding tends to occur. As a result, urgently sought is a means to improve storage stability of images prepared employing dye inks.

(Patent Document 1)
  Japanese Patent Publication Open to Public Inspection (hereinafter referred to as JP-A) No. 55-18412 (claims)

(Patent Document 2)
  JP-A No. 3-6270 (claims)

(Patent Document 3)
  JP-A No. 3-160068 (claims)

(Patent Document 4)
  JP-A No. 3-163175 (claims)

(Patent Document 5)
  JP-A No. 2001-187852 (claims)

SUMMARY

From the viewpoint of the foregoing, the present invention was achieved. An objective of the present invention is to provide an ink jet recording method, employing a dye ink, which results in excellent gas fading resistance, glossiness, ink absorption property and bleeding resistance.

The aforesaid objective of the present invention was achieved employing the following embodiments.

(1) An ink jet recording method wherein an aqueous dye ink comprising nonionic resinous micro-particles, a water-soluble dye, water, and an organic solvent is ejected onto an ink jet recording media which comprises a support having thereon at least one ink absorptive layer and an outermost layer, as an ink absorptive layer farthest from the aforesaid support, which comprises a void structure comprising micro-particles of inorganic pigment as well as a cationic polymer, whereby an image is recorded.

(2) The ink jet recording method, described in item 1 above, wherein the aforesaid micro-particles of inorganic pigment are comprised of silica.

(3) The ink jet recording method, described in item 1 or item 2 above, wherein the weight ratio (A:B) of the aforesaid cationic polymer (A) to the aforesaid micro-particles of inorganic pigment (B) is 1:5–1:50.

(4) The ink jet recording method, described in any one of items 1–3 above, wherein the aforesaid support is non-water absorptive.

(5) The ink jet recording method, described in any one of items 1–4 above, wherein the average diameter of the aforesaid nonionic resinous micro-particles is between 10 and 200 nm.

(6) The ink jet recording method, described in any one of items 1–5 above, wherein the proportion of the aforesaid nonionic resinous micro-particles in the aforesaid aqueous dye ink is 0.2–10.0 percent by weight.

(7) The ink jet recording method, described in any one of items 1–6 above, wherein either the minimum film forming temperature (MFT) or the glass transition temperature (Tg) of the aforesaid nonionic resinous micro-particles is 60° C. or less.

From the viewpoint of the aforesaid problems, the inventors of the present invention performed diligent investigations. As a result, it was discovered that an ink jet recording method employing a dye ink which resulted in excellent gas fading resistance, glossiness, and bleeding resistance was realized in such a manner that images were recorded by ejecting an aqueous ink comprising nonionic resinous micro-particles, water-soluble dyes, water and organic solvents on the ink jet recording media which comprised a support having thereon at least one ink absorptive layer and in which the outermost layer as the ink absorptive layer furthest from the aforesaid support comprised a void structure comprising micro-particles of organic pigment and cationic polymers.

Namely, it is possible to form images which exhibit excellent gas fading resistance, glossiness, ink absorption property and bleeding resistance by carrying out stable film formation employing nonionic resinous micro-particles, while printing is achieved on the recording media comprising a void type uppermost layer comprising inorganic micro-particles and cationic polymers to minimize bleeding employing a water-soluble dye ink into which nonionic resinous micro-particles have been incorporated. In order to minimize bleeding, cationic polymers are incorporated into the outermost layer of the recording media. When resinous micro-particles incorporated into ink are anionic, the particles tend to aggregate on the printing surface, leading to a decrease in glossiness.

When the nonionic resinous micro-particles is applied on the surface of the ink receiving media, instead of applying in the ink, in order to improve gas fading resistance, ink absorbing property of the ink receiving media decreases significantly and ink bleeding occurs. Therefore, the application of the nonionic resinous micro-particles on the surface of the ink receiving media is almost impracticable for use.

When the nonionic resinous micro-particles is applied inside of the ink receiving media in order to improve ink absorbing property, sufficient amount of gas fading resistance cannot be achieved.

In the present invention, both gas fading resistance and ink absorbing property can be improved by adding the nonionic resinous micro-particles in the ink.

By employing the embodiments of the present invention, a gas barrier layer is formed in such a manner that on the outermost layer, a film is formed employing nonionic resinous micro-particles in the ink. As a result, dye fading due to oxidizing gases is minimized, and further, smoothness is enhanced due to film formation on the surface which improves glossiness.

DESCRIPTION OF THE PREFERRED EMBODIMENTS

The present invention will now be detailed.

Initially, an ink jet recording medium according to the present invention will be described.

One of its features is that the ink jet recording medium according to the present invention comprises a support having thereon at least one ink absorptive layer, and the outermost layer as the aforesaid ink absorptive layer which is positioned farthest from the aforesaid support is comprised of a void structure comprising micro-particles of inorganic pigment and cationic polymers.

In the present invention, the micro-void structure designate a structure which is formed with a weak aggregation of a binder and inorganic micro-particles. The void ratio in the surface section is preferably 30 to 70 volume %.

The void ratio of the present invention is defined as a ratio of the volume to the volume of. As one method, it may be determined based on the following formula.

The void ratio=100×[(total dry thickness−coated solid thickness)/total dry thickness]

Further, based on the following method, the void ratio of the total ink absorbing layer or of the surface layer. For example, only the total ink absorbing layer or the surface layer is coated onto 100 μm polyethylene terephthalate, after which the void ratio may be easily determined through the saturated transition amount or the absorbed water amount utilizing Bristow's Measurement.

A porous layer is formed primarily by weak coagulation of a water soluble binder and inorganic micro-particles. Heretofore, various methods to form voids in film are known, for example: a method to form voids with phase separation of polymers mutually during the drying process, after application of a uniform coating composition containing at least two polymers onto a support; a method to form voids with dissolution of solid micro-particles by soaking ink-jet recording sheet paper in water or appropriate organic solvent after coating and drying of the coating compositions containing solid micro-particles and a hydrophilic or hydrophobic binder, onto a support; a method to form voids in film by foaming of the material during the drying process after application of the coating composition containing a compound having the capability to foam during film formation; a method to form voids in fine porous particles or among micro-particles with coating of the coating compound containing porous solid micro-particles and a hydrophilic binder on a support; a method to form voids among solid micro-particles with application of the coating composition containing fine solid particles and/or micro-particle oil drops having a volume of more than or equivalent to that of the hydrophilic binder and a hydrophilic binder onto a support. Specifically preferred is to form voids containing various inorganic solid micro-particles of an average particle size of at most 100 nm in the porous layer in the present invention.

A preferable ink absorbing layer of the present invention having a porous structure contains inorganic micro-particles and a hydrophilic binder. More preferable ink absorbing layer is a layer having glossiness on the surface.

Cited as examples of fillers, being inorganic pigments, used in this invention may be white inorganic pigments such as light precipitated calcium carbonate, heavy calcium carbonate, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, diatomaceous earth, calcium silicate, magnesium silicate, silica, colloidal silica, alumina, colloidal alumina, pseudo boehmite, aluminum hydroxide, lithopone, zeolite, and magnesium hydroxide.

The average diameter of the micro-particles of inorganic pigment is preferably not more than 200 nm by considering glossiness and color density. More preferably it is not more than 100 nm. The lowest value of the average diameter the micro-particles of inorganic pigment is not specifically limited, but by considering production points, it is preferably not less than 10 nm.

The average diameter of the inorganic micro-particles may be calculated as follows. The particles themselves, or the cross-section or surface of a surface layer, is observed employing an electron microscope, and each diameter of 1,000 randomly selected particles is determined. The simple average (the numerical average) is obtained as the diameter of the particles based on the determined diameter. Herein, each particle diameter is represented by the diameter of a circle having the same projection area as that of the particle.

The above-mentioned inorganic pigment may be formed as a primary particle or a secondary particle or a higher aggregation particle in an ink absorbing layer. The average particle diameter can be obtained from particles which are independent in the porous layer when observed with microscope.

When the inorganic micro-particles are secondary or higher aggregation particles, the average diameter of the first particles is less than the value observed in the porous layer. The average diameter of the first particles of the inorganic micro-particles is preferably not more than 50 nm. More preferably, it is not more than 30 nm, and still more preferably, it is from 4 to 20 nm.

Solid micro-particles selected from silica, alumina and alumina hydrate are preferably used as inorganic micro-particles. Silica is more preferably used.

Silica synthesized with a typical wet method, amorphous silica, colloidal silica and silica synthesized with a gas phase method may be employed as usable silica in the present invention, and further, specifically preferable is micro-particle silica, colloidal silica and silica synthesized with a gas phase method in the present invention. Of these, micro-particle silica synthesized with a gas phase method is preferable at a high void ratio as can be obtained. Alumina and alumina hydrate may be crystalline or amorphous, and optional shapes of undetermined form, spherical or needle-shaped may also be used.

As the most preferably used silica synthesized via a gas phase method having an average particle size of primary particles of 4–20 nm, Aerosil produced by Nippon Aerosil Co., Ltd. is commercially available on the market. This micro-particle silica synthesized by a gas phase method is relatively easily dispersed into primary particles in water using Jet-stream Inductor Mixer manufactured by Mitamura Riken Kogyo Co., Ltd., employing suction dispersion.

Subsequently, cationic polymers will be described.

Cationic polymers which are employed in the outermost layer according to the present invention are not particularly limited and include prior art cationic polymers conventionally known to prepare ink jet recording sheets. Listed as such polymers are those, for example, described in "Ink Jet Printer Gijutsu to Zairyo (Ink Jet Printer Technology and Materials)", page 268 (published by CMC Co., Ltd.), as well as JP-A 9-193532. Of these, preferred are cationic polymers having a quaternary ammonium salt group. Listed as such examples may be cationic polymers having a guanidyl group described in JP-A 57-64591, dimethyldiallylammonium chloride described in JP-A 59-20696, polyaminesulfones described in JP-A 59-33176, (meth)acrylamidoalkyl quaternary ammonium salts or (meth)acrylamidoalkyl quaternary ammonium salt type cationic polymers described in JP-A 63-115780, copolymers of dimethylallylammonium chloride with acrylamide described in JP-A Nos. 64-9776 and 64-75281, cationic polymers comprising at least two quaternary nitrogen atoms in repeated units described in JP-A 3-133686, vinylpyrrolidone having a quaternary ammonium salt group described in JP-A 4-288283, cationic polymers described in JP-A Nos. 6-92010 and 6-234268, prepared by allowing a secondary amine to react with epipahydrin, polystyrene type cationic polymers described in International Patent Publication Open to Public Inspection No. 99-64248, and cationic polymers comprised of repeated units having at least two cationic groups described in JP-A No. 11-348409.

In the present invention, preferred as cationic polymers are those having a quaternary ammonium salt group, more preferred are those having a quaternary ammonium salt group at a side chain, and most preferred are those represented by General Formula (1), having repeated units.

General Formula (1)

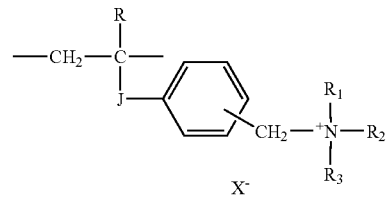

In General Formula (1), R represents a hydrogen atom or an alkyl group, $R_1$, $R_2$, and $R_3$ each represents an alkyl group or a benzyl group, J is a linking means or a divalent organic group, and $X^-$ represents an anion group.

In aforesaid General Formula (1), preferred as the alkyl group represented by R is a methyl group. Preferred as the aforesaid alkyl group represented by $R_1$, $R_2$, and $R_3$ is a methyl group, an ethyl group, or a benzyl group. Preferred as the divalent organic represented by J is —CON(R')—, wherein R' represents a hydrogen atom or an alkyl group.

Listed as anion groups represented by X are, for example, a halogen ion, an acetic acid ion, a methylsulfuric acid ion, and p-toluenesulfonates.

Preferred as cationic polymers may be homopolymers comprised of the repeated units represented by aforesaid General Formula (1) or copolymers with other copolymerizable monomers. Listed as copolyerizable repeated units may be cationic monomers other than those represented by aforesaid General Formula (1) and monomers having no cationic group.

Listed as monomers having a cationic group may be, for example, the repeated units described below.

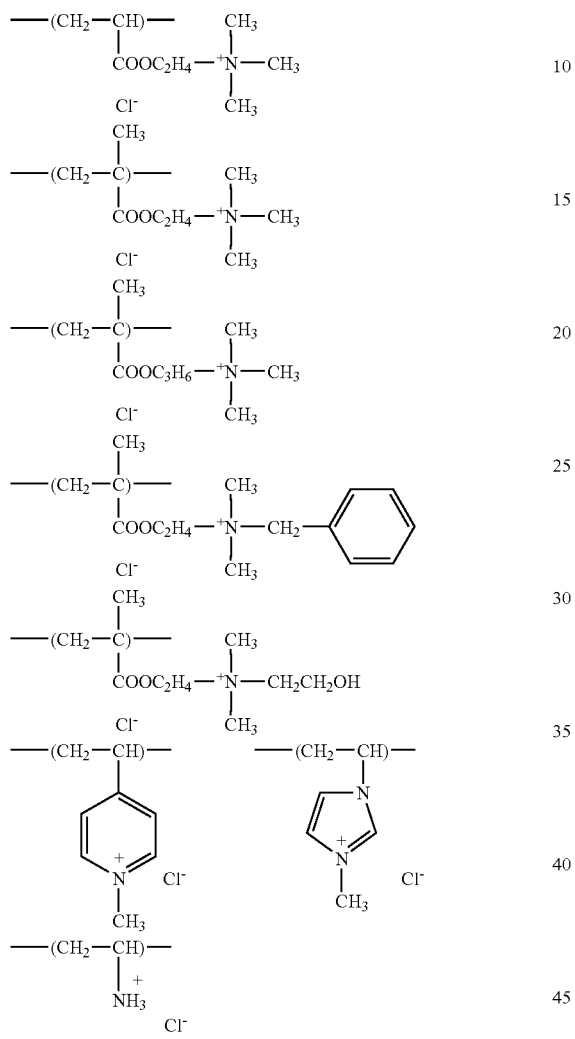

Listed as copolymerizable repeated units having no cationic group may be, for example, ethylene, styrene, butadiene, methyl methacrylate, ethyl methacrylate, propyl methacrylate, butyl methacrylate, octyl methacrylate, methyl acrylate, ethyl acrylate, propyl acrylate, butyl acrylate, octyl acrylate, hydroxylethyl methacrylate, acrylamide, vinyl acetate, vinyl methyl ether, vinyl chloride, 4-vinylpyridine, N-vinylpyrrolidone, N-vinylimidazole, and acrylonitrile.

When cationic polymers, which are preferably employed in the present invention, have the repeated units represented aforesaid General Formula (1), the proportion of the repeated units represented by aforesaid General Formula (1) is preferably at least 20 mol percent, and is more preferably 40–100 mol percent.

Specific examples of the repeated units represented by General Formula (1) according to the present invention are listed below. However, the present invention is not limited thereto.

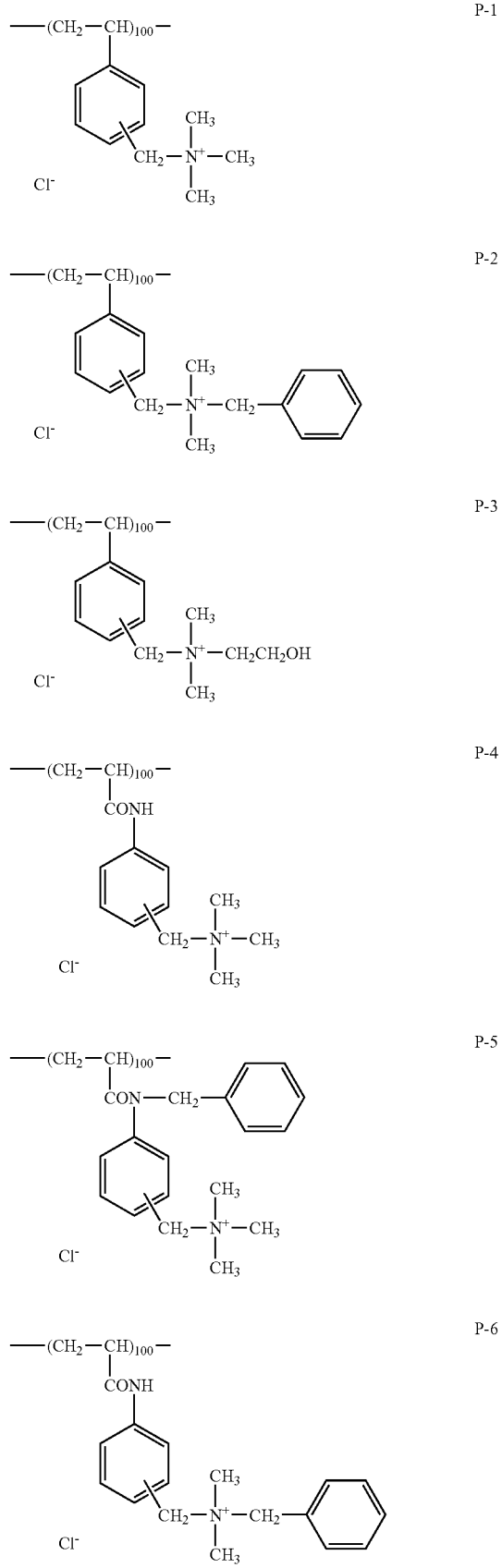

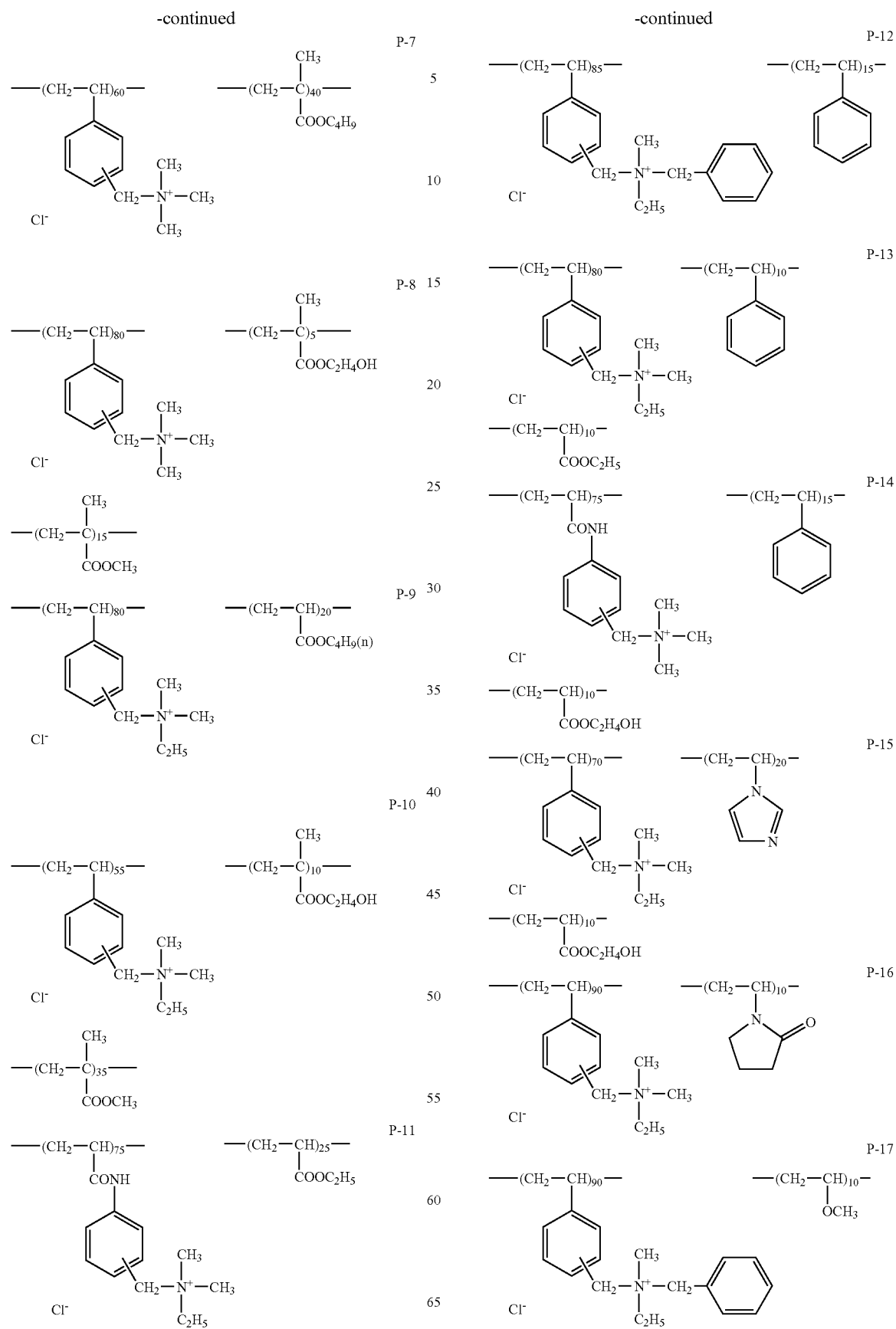

-continued

P-18

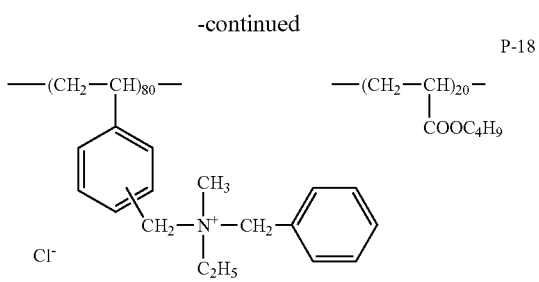

The average molecular weight of the aforesaid cationic polymers is customarily 3,000–200,000, and is preferably 5,000–100,000. The average molecular weight is represented by a polyethylene glycol conversion value determined by employing gel permeation chromatography.

The weight ratio of the micro-particles of inorganic pigment to the cationic polymer is variable in accordance with kinds of the micro-particles, average particle diameter, kinds of polymer, or weight-average molecular weight. In the present invention, a preferable weight ratio (A:B) of the aforesaid cationic polymer (A) to the aforesaid micro-particles of inorganic pigment (B) is 1:5–1:50.

The used amount of the cationic polymers according to the present invention is customarily 0.1–10 g per m² of the recording sheet, and is preferably 0.2–5 g.

A water soluble binder may be further incorporated in the outermost layer of the present invention.

Listed as examples of the water soluble binders are: polyvinyl alcohol, gelatin, polyethylene oxide, polyvinylpyrrolidone, polyacrylic acid, polyacryl amide, polyurethane, dextran, dextrin, carrageenan (κ, ι, λ), agar, pullulan, water soluble polyvinyl butyral, hydroxyethyl cellulose, and carboxymethyl cellulose. These water soluble resins may be used in combination of more than two kinds.

A water soluble binder preferably used in the present invention is polyvinyl alcohol. Polyvinyl alcohols employed in the present invention include common polyvinyl alcohol prepared by hydrolyzing polyvinyl acetate, and in addition, modified polyvinyl alcohols such as terminal cation-modified polyvinyl alcohol and anion-modified polyvinyl alcohol having an anionic group.

The average degree of polymerization of polyvinyl alcohol prepared by hydrolyzing vinyl acetate is preferably 1,000 or more, and is more preferably from 1,500–5,000. Further, the saponification ratio is preferably from 70–100%, and is more preferably from 80–99.5%.

Cation-modified polyvinyl alcohols are, for example, polyvinyl alcohols having a primary to a tertiary amino group, or a quaternary ammonium group in the main chain, or side chain of the foregoing polyvinyl alcohols, as described in JP-A 61-10483, and are obtained upon saponification of a copolymer of ethylenic unsaturated monomers having a cationic group and vinyl acetate.

Listed as ethylenic unsaturated monomers having a cationic group are, for example, trimethyl-(2-acrylamido-2,2-dimethylethyl)ammonium chloride, trimethyl-(3-acrylamido-3,3-dimethylpropyl)ammonium chloride, N-vinylimidazole, N-vinyl-2-methylimidazole, N-(3-dimethylaminopropyl)methacrylamide, hydroxyethyltrimethylammonium chloride, trimethyl-(2-methacryamidopropyl) ammonium chloride, and N-(1,1-dimethyl-3-dimethylaminopropyl)acrylamide.

The content ratio of monomers containing a cation-modified group of the cation-modified polyvinyl alcohol is 0.1–10 mol % to the vinyl acetate, and is preferably 0.2–5 mol %.

Listed as anion-modified polyvinyl alcohols are, for example, polyvinyl alcohols having an anionic group as described in JP-A 1-206088, copolymers of vinyl alcohols and vinyl compounds having a water solubilizing group as described in JP-A 61-237681 and 63-307979, and modified polyvinyl alcohols containing a water solubilizing group, as described in JP-A 7-285265.

Further, listed as nonion-modified polyvinyl alcohols are, for example, polyvinyl alcohol derivatives in which a polyalkylene oxide group is added to a part of polyvinyl alcohol as described in JP-A 7-9758, as well as block copolymers of vinyl compounds having a hydrophobic group and polyvinyl alcohols as described in JP-A 8-25795.

Polyvinyl alcohols, in which the degree of polymerization or modification differ, may be employed in a combination of at least two types.

The thickness of the surface layer of this invention is preferably 3–15 μm. As a measuring method for the surface layer thickness, listed as one method is to sever the cross-section of the recording medium through the surface layer precisely in the perpendicular direction, after which it is observed using an optical microscope or scanning electron microscope.

The added amount of the water soluble binder, employed in the porous layer, varies largely depending on the desired ink absorption capacity, the void ratio of the void layer, the types of fine inorganic particles, and the types of water soluble binders, but is generally from 5–30 g per m² of the recording sheet, and is preferably from 10–25 g.

The ink-jet recording medium of the present invention is preferably provided with an ink absorbing layer which absorbs an ink solvent, between a support and the outermost layer.

An ink absorbing layer provided between a support and the outermost layer is divided mainly into two types, a swelling and a porous type. A porous type layer is formed by coating of a water soluble binder alone or in a combination of them, such as gelatin, polyvinyl alcohol, polyvinyl pyrrolidone, and polyethylene oxide, to obtain an ink absorbing layer.

As a porous type layer, the micro-particles and water soluble binders are coated after mixing, and a layer exhibiting high gloss is preferred. As micro-particles, alumina or silica is preferably used, and specifically silica having a particle size of at most 0.1 μm is preferred. As a water soluble binder, gelatin, polyvinyl alcohol, polyvinylpyrrolidone and polyethylene oxide may preferably be used alone or in combination.

To provide aptitude of continuous or high speed printing, a recording medium having a high speed ink absorption rate is more suitable than one having a low rate. From this point of view, the porous type is preferably employed.

As inorganic micro-particles used for the above-mentioned purpose, the same micro-particles as inorganic pigment particles may be used in the foregoing surface layer.

Further, as a hydrophilic binder, listed is the same compound as the water soluble binder described in the forgoing surface layer.

The added amount of inorganic micro-particles employed in the porous layer which is provided between a support and the outermost layer varies largely depending on the desired ink absorption capacity, the void ratio of the void layer, the types of fine inorganic particles, and the types of water soluble binders, but is generally from 5–30 g per $m^2$ of the recording sheet, and is preferably from 10–25 g.

The ratio of inorganic micro-particles to a water soluble binder, employed in the porous layer which is provided between a support and the outermost layer is generally from 2:1 to 20:1, and is preferably from 3:1 to 10:1.

The ink absorbing layer which is provided between a support and the outermost layer may contain a cationic water soluble polymer having a quaternary ammonium salt group in the molecule, which is generally employed in the range of 0.1–10 g per $m^2$ of the recording sheet, and is preferably from 0.2–5 g.

The total amount of the voids (meaning void volume) in the porous layer which is provided between a support and the outermost layer is preferably at least 20 ml per $m^2$ of the recording sheet.

By making the total amount of the voids at least 20 ml per $m^2$ of the recording sheet, ink absorbability is adequate for high ink volume at printing, resulting in improving image quality and high ink drying speed.

As another porous type ink absorbing layer which is provided between a support and the outermost layer, other than forming an ink absorbing layer using inorganic micro-particles, the ink absorbing layer can be formed using a coating composition containing a polyurethane resin emulsion in combination with a water soluble epoxy compound and/or an acetoacetylated polyvinyl alcohol, and further an epichlorohydrin polyamide resin. A polyurethane resin emulsion in this case is preferably a polyurethane emulsion having a particle diameter of 3.0 µm, in which the particles have a polycarbonate chain or a polycarbonate chain and polyester chain. It is more preferable that the polyurethane resin of the polyurethane resin emulsion has a sulfon group in the molecule and also an epichlorohydrin polyamide resin and a water soluble epoxy compound and/or an acetoacetylated vinyl alcohol. Herein, the polyurethane resin is obtained with reaction of polycarbonate polyol, polyol having polycarbonate polyol and polyester polyol, and an aliphatic isocyanate compound.

It is presumed that slight coagulation of cations and anions is formed in the ink solvent absorbing layer using the foregoing polyurethane resin, and based on this, the voids having ink absorbing capability are formed to produce images.

In this invention, the average void ratio of the total ink absorbing layers of the ink-jet recording medium is preferably 40–70%.

Now, a support used for the ink-jet recording medium of this invention will be described.

Supports usable in the present invention are common ones for an ink-jet recording sheet, which may be appropriately chosen from paper supports such as standard paper, art paper, coated paper and cast-coated paper; plastic supports; paper supports coated on both sides with polyolefin; and complex supports of pastes of these supports. From the viewpoint of exhibiting effects of this invention, a non-water permeable support is specifically preferable.

As non-water permeable supports usable in this invention, listed are a plastic resin film support or a support in which both sides of a paper base are covered with a plastic resin film. As such plastic resin film supports, listed are, for example, polyester film, polyvinyl chloride film, polypropylene film, cellulose triacetate film, polystyrene film and a film support laminated with these films. These employed plastic resin films may be transparent or translucent.

In this invention, a specifically preferable support is a support which is prepared by covering both sides of a paper base with a plastic resin, and the most preferable support is one which is prepared by covering both sides of a paper base with a polyolefin resin.

The specifically preferable support in this invention will be described below, which is prepared by covering both sides of the paper base with a polyolefin resin.

Paper employed in the supports of this invention is made by employing wood pulp as the main raw material, and if desired, synthetic pulp such as polypropylene or synthetic fiber such as nylon and polyester. Employed as the wood pulp may be any of LBKP, LBSP, NBKP, NBSP, LDP, NDP, LUKP, and NUKP. However, it is preferable that LBKP, NBSP, LBSP, NDP, and LDP comprising short fiber components in a relatively large amount are preferably employed. Incidentally, the ratio of LBSP and/or LDP is preferably 10 to 70 weight %. Preferably employed as the foregoing pulp is chemical pulp (sulfate pulp and sulfite pulp) comprising minimal impurities. Further, also useful is pulp which has been subjected to a bleaching treatment to enhance whiteness.

Suitably incorporated into the paper base may be sizing agents such as higher fatty acids and alkylketene dimers; white pigments such as calcium carbonate, talc, and titanium oxide; paper strength enhancing agents such as starch, polyacrylamide, and polyvinyl alcohol; fluorescent brightening agents; moisture retention agents such as polyethylene glycols; dispersing agents; and softeners such as quaternary ammonium.

The degree of water freeness of pulp employed for paper making is preferably between 200 and 500 ml based on CSF Specification. Further, the sum of the weight % of 24-mesh residue and the weight % of 42-mesh residue regarding the fiber length after beating, specified in JIS P-8207, is preferably 30–70%. Further, the weight % of 4-mesh residue is preferably not more than 20 weight %.

The basis weight of the paper base is preferably 50–250 g, and is specifically preferably 70–200 g. The thickness of the paper base is preferably 50–210 µm.

During the paper making stage, or alternatively after paper making, the paper base may be subjected to a calendering treatment to result in excellent smoothness. The density of the paper base is generally 0.7–1.2 $g/m^3$ (JIS P-8118). Further, the stiffness of the paper base is preferably 20–200 g under the conditions specified in JIS P-8143.

The surface sizing agent may be coated onto the paper base surface. As a surface sizing agent, the same one as described above, added to the paper base, may be employed.

The pH of the paper base, when determined employing a hot water extraction method specified in JIS P-8113, is preferably 5–9.

Next, polyolefin resin which covers both sides of the paper will now be described. Examples of polyolefin resins used for this purpose include polyethylene, polypropylene, and polyisobutylene. A type of polyolefin such as a copolymer comprising of mainly propylene is preferable, and polyethylene is specifically preferable.

The specifically preferable polyethylene will be described below.

Polyethylene covering the surface side and reverse side of a paper base is primarily low density polyethylene (LDPE) and/or high density polyethylene (HDPE), but other LLDPE or polypropylene may also at times be employed.

Specifically, the polyethylene layer of the coating layer side features improved opacity and whiteness by adding rutile or anatase type titanium oxide. The added amount of titanium oxide is generally 1–20% to polyolefin, and preferably 2–15%.

To the polyolefin layer, a heat resistance coloring agent and a fluorescent brightening agent may, if beneficial, be added to adjust the white background.

As examples of such beneficial coloring agents, listed are ultramarine, iron blue, cobalt blue, phthalocyanine blue, manganese blue, cerulean blue, tungsten blue, molybdenum blue, and anthraquinone blue.

As fluorescent brightening agents, listed are, for example, dialkylaminocoumarin, bisdimethylaminostilbene, bismethylaminostilbene, 4-alkoxy-1,8-naphthalenedicarboxylate-N-alkylamide, bisbenzoxazolyl ethylene, and alkylstilbene.

The utilized amount of polyethylene providing on the front or rear surface of the raw paper base is chosen to optimize the thickness of the ink absorbing layer and minimize curling at low humidity as well as high humidity after providing a backing layer. The thickness of the polyethylene layer on the ink absorbing layer side is usually 15–50 μm, and that of the polyethylene layer on the backing layer side is usually in the range of 10–40 μm. The ratio of polyethylene on the front and rear sides is optimally chosen to minimize curling, which may vary with the kind and thickness of the ink absorbing layer and the thickness of the raw paper base. Generally the thickness ratio of the front/rear side is respectively 3/1–1/3.

Further, the foregoing paper substrate covered with polyethylene preferably exhibits the following properties (1) to (7):

(1) Tensile strength in the longitudinal direction is preferably 19.6–294 N and that in the lateral direction is 9.8–196 N in terms of strength specified in JIS-P-8113.

(2) Tear strength in the longitudinal direction is preferably 0.20–2.94 N and 0.098–2.45 N in the lateral direction in terms of strength specified in JIS-P-8116.

(3) Compression elastic modulus is preferably 9.8 kN/cm$^2$.

(4) Opacity is preferably more than 80%, and is specifically preferably 85–98%, when measured employing the method specified in JIS-P-8138.

(5) Whiteness at L*, a*, b* are each preferably L*=80–96, a*=−3–+5, and b*=−7–+2, in terms of whiteness specified in JIS-Z-8727.

(6) Clark stiffness: a preferable support exhibits a Clark stiffness of 50–300 cm$^3$/100 in the transfer direction of the recording sheet.

(7) Moisture content of the raw paper base is preferably 4–10% to the core paper.

(8) Surface glossiness (at 75-degree specular glossiness) of the ink absorbing layer side is preferably 10–90%.

Aqueous dye ink according to the present invention will now also be described.

The aqueous dye ink according to the present invention is characterized in incorporating at least nonionic resinous micro-particles, a water soluble dye, water, and an organic solvent.

Initially described will be nonionic resinous micro-particles according to the present invention.

Examples of polymers which constitute nonionic resinous micro-particles, which are usable in the present invention, include, but are not limited to, acryl based resins (e.g., acryl resins, acryl-styrene copolymers, acryl-vinyl acetate copolymers, and acryl-silicone copolymers), urethane resins, polyester resins, vinyl acetate based resins (e.g., vinyl acetate resins and vinyl acetate-ethylene copolymers), butadiene based resins (e.g., styrene-butadiene copolymers and acrylonitrile-butadiene copolymers), fluorine based resins, and polyamide based resins. Micro-particles of these resins are prepared employing an emulsion polymerization method. Employed as surfactants and polymerization initiators which are employed in the emulsion polymerization may be those which are employed in conventional methods. Synthesis methods of resinous micro-particles are detailed in U.S. Pat. Nos. 2,852,368, 2,853,457, 3,411,911, 3,411,912, and 4,197,127, Belgian Patent Nos. 688,882, 691,360, and 712,823, Japanese Patent Publication No. 45-5331, and JP-A Nos. 60-18540, 51-130217, 58-137831, and 55-50240.

Further, commercial nonionic resinous micro-particles according to the present invention are readily available. Listed as examples may be Superflex 500 and 550, manufactured by Dai-Ichi Kogyo Seiyaku Co., Ltd.; Bondic 1040N, 1050-NS, 1230NS, 1250, 1310NSA, 1610NS, 1670NS, 1850NS, 1910, 1980NS, 2210, 2220, WLI-601, WLI-602, ES-850, and ES-801, manufactured by Dainippon Ink and Chemicals Inc.; Sumikaflex S-305, S-400, S-400HQ, S-4210, S-450, S-460, S-7400, S-480, S-700, S-751, S-830, S-950, and S-960, manufactured by Sumitomo Chemical Co., Ltd.; Takelac W-512A6, W-635, and XW-74-X08N, manufactured by Takeda Chemical Industries, Ltd.; Everfanol AP-6, AP-12, AP-24, APC-55, and APC-66, manufactured by NICCA Chemical Co., Ltd.; and ULS-700 and ULS-1700, manufactured by Ipposha Oil Industries Co., Ltd.

A preferable synthetic method for the nonionic resinous micro-particles of the present invention is an emulsion polymerization method. The preferable nonionic resinous micro-particles of the present invention can be obtained by forcibly dispersing a monomer with a nonionic dispersion agent, the method is called forced emulsion the emulsion is called a forced emulsion type. Another preferable nonionic resinous micro-particles of the present invention can be obtained by self-dispersing a monomer having a hydrophilic group or a hydrophilic segment in the molecule, the method is called a self-dispersed method and the emulsion is called a self-dispersed emulsion type.

Listed examples of nonionic dispersion agents are nonionic surfactants such as, polyoxyethylene alkyl ethers, polyoxyethylene alkyl allyl ethers, acetylene glycols, and polyoxyethylene-polyoxypropyrene blockpolymers; or hydrophilic binders such as, polyethylene glycols, polyvinyl alcohols, polyvinyl pyrrolidones, and hydroxy methyl cellulose.

The self-dispersed emulsion type is more preferable than the forced emulsion type from the point of ink absorbing property. The self-dispersed emulsion type does not contain a dispersion agent and therefore bleeding of a dispersion agent does not occur. While, the forced emulsion type contains a dispersion agent and tends to occur bleeding of a dispersion agent, which may decrease ink absorbing ability of the recording media.

In the present invention, the average diameter of nonionic resinous micro-particles is preferably 10–200 nm, and is more preferably 50–150 nm.

The average diameter of the nonionic resinous micro-particles is easily determined employing commercially available particle size measurement apparatuses employing a light scattering system or a laser Doppler system, such as Zeta Sizer 1000 (manufactured by Malvern Inc.).

Further, in the water-soluble dye ink according to the present invention, the proportion of nonionic resinous micro-particles in the aforesaid ink is preferably 0.2–10 percent by weight, but is more preferably 0.5–5 percent by weight. When the proportion of the nonionic resinous micro-particles is at least 0.2 percent by weight, it is possible to effectively enhance gas fading resistance. On the other hand, it is preferably at most 10 percent by weight because ink ejection is more stabilized and it is possible to minimize the increase in ink viscosity during storage.

When the anionic resinous micro-particles are incorporated in an ink containing a water soluble dye, a preferable weight ratio of nonionic resinous micro-particles to the anionic resinous micro-particles is 1:1 or less, more preferably, the weight ratio is less than 1:0.5 or less.

Further, in the present invention, either the minimum film forming temperature (MFT) or the glass transition temperature (Tg) of nonionic resinous micro-particles is preferably 60° C. or less. In the present invention, in order to control the minimum film forming temperature of the nonionic resinous micro-particles, film forming aids may be incorporated. The aforesaid film forming aids are also called plasticizers which are organic compounds (commonly, organic solvents). Such compounds decrease the minimum film forming temperature of polymer latexes and are described, for example, in Soichi Muroi, "Gousei Latex no Kagaku (Chemistry of Synthesized Latexes)" (published by Kobunshi Kanko Kai, 1970).

The water-soluble dye ink according to the present invention comprises at least a water-soluble dye, water, and an organic solvent other than the aforesaid nonionic resinous micro-particles.

Listed as water-soluble dyes usable in the present invention may be azo dyes, methane dyes, azomethine dyes, xanthene dyes, quinone dyes, phthalocyanine dyes, triphenylmethane dyes, and diphenylmethane dyes. Specific compounds are listed below, however, the present invention is not limited to these exemplified compounds.

<C.I. Acid Yellow>
1, 3, 11, 17, 18, 19, 23, 25, 36, 38, 40, 42, 44, 49, 59, 61, 65, 67, 72, 73, 79, 99, 104, 110, 114, 116, 118, 121, 127, 129, 135, 137, 141, 143, 151, 155, 158, 159, 169, 176, 184, 193, 200, 204, 207, 215, 219, 220, 230, 232, 235, 241, 242, 246

<C.I. Acid Orange>
3, 7, 8, 10, 19, 24, 51, 56, 67, 74, 80, 86, 87, 88, 89, 94, 95, 107, 108, 116, 122, 127, 140, 142, 144, 149, 152, 156, 162, 166, 168

<C.I. Acid Red>
1, 6, 8, 9, 13, 18, 27, 35, 37, 52, 54, 57, 73, 82, 88, 97, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, 415

<C.I. Acid Violet>
17, 19, 21, 42, 43, 47, 48, 49, 54, 66, 78, 90, 97, 102, 109, 126

<C.I. Acid Blue>
1, 7, 9, 15, 23, 25, 40, 62, 72, 74, 80, 83, 90, 92, 103, 104, 112, 113, 114, 120, 127, 128, 129, 138, 140, 142, 156, 158, 171, 182, 185, 193, 199, 201, 203, 204, 205, 207, 209, 220, 221, 224, 225, 229, 230, 239, 249, 258, 260, 264, 278, 279, 280, 284, 290, 296, 298, 300, 317, 324, 333, 335, 338, 342, 350

<C.I. Acid Green>
9, 12, 16, 19, 20, 25, 27, 28, 40, 43, 56, 73, 81, 84, 104, 108, 109

<C.I. Acid Brown>
2, 4, 13, 14, 19, 28, 44, 123, 224, 226, 227, 248, 282, 283, 289, 294, 297, 298, 301, 355, 357, 413

<C.I. Acid Black>
1, 2, 3, 24, 26, 31, 50, 52, 58, 60, 63, 107, 109, 112, 119, 132, 140, 155, 172, 187, 188, 194, 207, 222

<C.I. Direct Yellow>
8, 9, 10, 11, 12, 22, 27, 28, 39, 44, 50, 58, 86, 87, 98, 105, 106, 130, 132, 137, 142, 147, 153

<C.I. Direct Orange>
6, 26, 27, 34, 39, 40, 46, 102, 105, 107, 118

<C.I. Direct Red>
2, 4, 9, 23, 24, 31, 54, 62, 69, 79, 80, 81, 83, 84, 89, 95, 212, 224, 225, 226, 227, 239, 242, 243, 254

<C.I. Direct Violet>
9, 35, 51, 66, 94, 95

<C.I. Direct Blue>
1, 15, 71, 76, 77, 78, 80, 86, 87, 90, 98, 106, 108, 160, 168, 189, 192, 193, 199, 200, 201, 202, 203, 218, 225, 229, 237, 244, 248, 251, 270, 273, 274, 290, 291

<C.I. Direct Green>
26, 28, 59, 80, 85

<C.I. Direct Brown>
44, 106, 115, 195, 209, 210, 222, 223

<C.I. Direct Black>
17, 19, 22, 32, 51, 62, 108, 112, 113, 117, 118, 132, 146, 154, 159, 169

<C.I. Basic Yellow>
1, 2, 11, 13, 15, 19, 21, 28, 29, 32, 36, 40, 41, 45, 51, 63, 67, 70, 73, 91

<C.I. Basic Orange>
2, 21, 22

<C.I. Basic Red>
1, 2, 12, 13, 14, 15, 18, 23, 24, 27, 29, 35, 36, 39, 46, 51, 52, 69, 70, 73, 82, 109

<C.I. Basic Violet>
1, 3, 7, 10, 11, 15, 16, 21, 27, 39

<C.I. Basic Blue>
1, 3, 7, 9, 21, 22, 26, 41, 45, 47, 52, 54, 65, 69, 75, 77, 92, 100, 105, 117, 124, 129, 147, 151

<C.I. Basic Green>
1, 4

<C.I. Basic Brown>
1

<C.I. Reactive Yellow>
2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, 176

<C.I. Reactive Orange>
1, 4, 5, 7, 11, 12, 13, 15, 16, 20, 30, 35, 56, 64, 67, 69, 70, 72, 74, 82, 84, 86, 87, 91, 92, 93, 95, 107

<C.I. Reactive Red>
2, 3, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 228, 235

<C.I. Reactive Violet>
1, 2, 4, 5, 6, 22, 23, 33, 36, 38

<C.I. Reactive Blue>

2, 3, 4, 5, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, 236

<C.I. Reactive Green>

8, 12, 15, 19, 21

<C.I. Reactive Brown>

2, 7, 9, 10, 11, 17, 18, 19, 21, 23, 31, 37, 43, 46

<C.I. Reactive Black>

5, 8, 13, 14, 31, 34, 39

The above-cited dyes are disclosed in "Sensyoku Notes, 21$^{th}$ edition, published by Sikisensya)

Among cited dyes, preferable dyes are phthalocyanine dyes. Examples of phthalocyanine dyes are dyes with no substituent or with an element in the center of the molecule. The elements in the center of the molecule are metals or non-metals. Preferred element is cupper. Preferred dye is C.I. Direct Blue 199.

Organic solvents used in the present invention are not specially limited. Examples of the water-soluble solvents include alcohols such as methanol, ethanol, propanol, isopropanol, butanol, isobutanol, secondary butanol, tertiary butanol, pentanol, hexanol, cyclohexanol and benzyl alcohol; polyhydric alcohols such as ethylene glycol, diethylene glycol, triethylene glycol, polyethylene glycol, propylene glycol, dipropylene glycol, polypropylene glycol, butylene glycol, hexanediol, pentanediol, glycerine, hexanetriol and thiodiglycol; polyhydric alcohol ethers such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether; amines such as ethanolamine, diethanol amine, triethanolamine, N-methyldiethanol amine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine and tetramethylpropylenediamine; amides such as formamide, N,N-dimethylformamide and N,N-dimethylacetoamide; heterocyclic compounds such as 2-pyrrolidone, N-methyl-2-pyrrolidone, N-cyclohexyl-2-pyrrolidone, 2-oxazolidone and 1,3-dimethyl-2-imidazolidinone; sulfoxides such as dimethylsuofoxide; sulfones such as sulfolane; urea; acetonitrile and acetone.

Various types of surfactants may be incorporated into the water-soluble dye ink according to the present invention. Surfactants usable in the present invention are not particularly limited. Examples include anionic surfactants such as dialkylsulfosuccinates, alkylnaphthalenesulfonates, and fatty acid salts, nonionic surfactants such as polyoxyethylene alkyl ethers, polyoxyethylene alkyl allyl ethers, acetylene glycols, and polyoxyethylene-polyoxypropylene block copolymers, and cationic surfactants such as alkylamines and quaternary ammonium salts. Of these, particularly preferably employed may be anionic surfactants as well as nonionic surfactants.

Further, in the ink of the present invention, employed may be high molecular surfactants. Listed as such surfactants may be, for example, styrene-acrylic acid-acrylic acid alkylester copolymers, styrene-acrylic acid copolymers, styrene-acrylic acid copolymers, styrene-maleic acid-acrylic acid alkylester copolymers, styrene-maleic acid copolymers, styrene-methacrylic acid-acrylic acid alkylester copolymers, styrene-methacrylic acid copolymers, styrene-maleic acid half ester copolymers, vinylnaphthalene-acrylic acid copolymers, and vinylnaphthalene-maleic acid copolymers.

Other than those described above, if desired, corresponding to purposes for enhancement of ejection stability, adaptability to the ink head and ink cartridge, storage stability, image retaining properties, and other performance, appropriately selected and employed may be various prior art additives such as viscosity modifiers, specific resistance controlling agents, film forming agents, UV absorbers, antioxidants, anti-fading agents, antifungal agents, and rust inhibitors. Further listed my be liquid paraffin, dioctyl phthalate, tricresyl phosphate, minute oil droplets such as silicone oil, UV absorbers described in JP-A Nos. 57-74193, 57-87988, and 62-261476, anti-fading agents described in JP-A Nos. 57-741192, 57-97989, 60-72785, 61-146591, 1-95091, and 3-13376, and optical brightening agents described in JP-A Nos. 59-42993, 59-52689, 62-280069, 61-242871, and 4-219266.

An ink jet head employed in the ink jet recording method of the present invention may be constituted by employing either an on-demand system or a continuous system. Specific examples of the ejection system include an electric-mechanical conversion system (e.g., a single cavity type, a double cavity type, a vendor type, a piston type, a share mode type, and a shared wall type), an electric-heat conversion system (e.g., a thermal ink jet type and a Bubble Jet (registered trade mark) type), an electrostatic attraction system (e.g., an electric field control type and a slit jet type), and a discharge system (e.g., a spark jet type). Any of these may be employed in the present invention.

EXAMPLES

The present invention will now be specifically described with reference to examples. However, the present invention is not limited thereto.

Example 1

<<Preparation of Recording Media>>

(Preparation of Recording Medium 1)

(Preparation of Silica Dispersion D1)

While stirring at 3,000 rpm at room temperature, added to 110 L of aqueous solution C1 (pH=2.5, containing 2 g of antifoaming agent SN381 manufactured by Sun Nobco Ltd.) containing 12 percent of cationic polymer (P-A), 10 percent by weight of n-propanol, and 2 percent of ethanol was 400 L of silica dispersion B1 (pH=2.4, containing 1 percent by weight of ethanol) containing 25 percent by weight of vapor phase method silica (Aerosil 200, manufactured by Nippon Aerosil Co., Ltd.) of an average diameter of 0.012 μm which had been uniformly dispersed and 0.3 percent by weight of water-soluble optical brightening agent Uvitex New Liquid (manufactured by Ciba Specialty Chemicals Co.). Subsequently, while stirring at 3,000 rpm, 54 L of an aqueous solution containing boric acid and borax at the weight ratio of 1:1 (concentration of 3 percent by weight for each) was gradually added to the resulting mixture at room temperature.

Subsequently, the resulting mixture was dispersed under a pressure of 3 kN/cm$^2$, employing a high pressure homogenizer manufactured by Sanwa Kogyo Co., Ltd. and the total volume was adjusted to 630 L by adding pure water, whereby nearly transparent Silica Dispersion D1 was prepared.

The aforesaid Silica Dispersion D1 was filtered employing a TCP-30 Type filter with a filtration accuracy of 30 μm, manufactured by Advantex Toyo Co.

(Preparation of Silica Dispersion D2)

While stirring at 3,000 rpm at room temperature, 400 L of aforesaid Silica Dispersion B1 was added to 120 L of an aqueous solution C2 (at a pH of 2.5) containing 12 percent by weight of a cationic polymer (P-2), 10 percent by weight of n-propanol, and 2 percent by weight of ethanol. Subsequently, while stirring, 52 L of aforesaid mixed aqueous solution was gradually added.

Subsequently, the resulting mixture was dispersed under a pressure of 3 kN/cm$^2$, employing a high pressure homogenizer, manufactured by Sanwa Industry Co., Ltd., and the total volume was then adjusted to 630 L by adding pure water, whereby almost transparent Silica Dispersion D2 was prepared.

Aforesaid Silica Dispersion D2 was filtered employing TCP-30 type filter with a filtering accuracy of 30 μm, manufactured by Advantech Toyo Co., Ltd.

(Preparation of Oil Dispersion)

While heating, dissolved in 45 kg of ethyl acetate were 120 kg of diisodecyl phthalate and 20 kg of an antioxidant (AO-1), and the resulting solution was mixed at 55° C. with 210 L of an aqueous gelatin solution containing 8 kg of acid process gelatin, 2.9 kg of cationic polymer P-1, and 10.5 kg of saponin. Subsequently, the resulting mixture was emulsify-dispersed employing a high pressure homogenizer. The total volume of the resulting dispersion was adjusted to 300 L by adding pure water, whereby an oil dispersion was prepared.

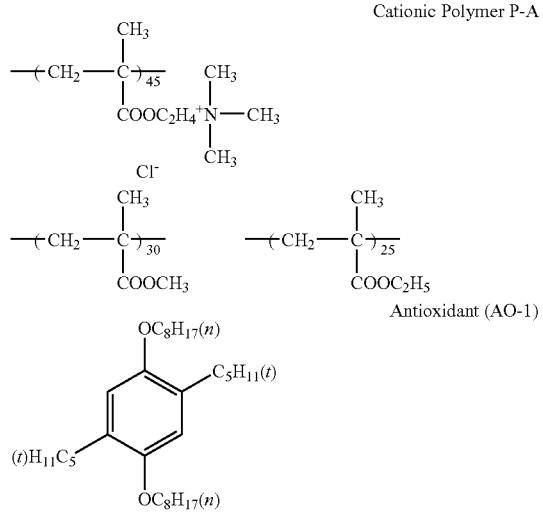

Cationic Polymer P-A

Antioxidant (AO-1)

(Preparation of Liquid Coating Compositions)

Each of the additives described below was successively added to each dispersion prepared as above, whereby a liquid coating composition was prepared. Incidentally, the volume of each additive is expressed per L.

| (First Layer Liquid Coating Composition: Lowermost Layer) | |
|---|---|
| Silica Dispersion D1 | 580 ml |
| 10 percent aqueous solution of polyvinyl alcohol (PVA203, manufactured by Kuraray Co., Ltd.) | 5 ml |
| 6.5 percent aqueous solution of polyvinyl alcohol (at an average degree of polymerization of 3,800 and a saponification ratio of 88 percent) | 290 ml |
| Oil dispersion | 30 ml |
| Latex dispersion (AE803, manufactured by Showa Highpolymer Co., Ltd.) | 42 ml |
| Ethanol | 8.5 ml |
| Water to make | 1000 ml |
| (Second Layer Liquid Coating Composition) | |
| Silica Dispersion D1 | 600 ml |
| 10 percent aqueous solution of polyvinyl alcohol (PVA203, manufactured by Kuraray Co., Ltd.) | 5 ml |
| 6.5 percent aqueous solution of polyvinyl alcohol (at an average degree of polymerization of 3,800 and a saponification ratio of 88 percent) | 270 ml |
| Oil dispersion | 20 ml |
| Latex dispersion (AE803, manufactured by Showa Polymer Co., Ltd.) | 22 ml |
| Ethanol | 8 ml |
| Pure water to make | 1000 ml |
| (Third Layer Liquid Coating Composition) | |
| Silica Dispersion D2 | 630 ml |
| 10 percent aqueous solution of polyvinyl alcohol (PVA203, manufactured by Kuraray Co., Ltd.) | 5 ml |
| 6.5 percent aqueous solution of polyvinyl alcohol (at an average degree of polymerization of 3,800 and a saponification ratio of 88 percent) | 270 ml |
| Oil dispersion | 10 ml |
| Latex dispersion (AE803, manufactured by Showa Polymer Co., Ltd.) | 5 ml |
| Ethanol | 3 ml |
| Pure water to make | 1000 ml |
| (Fourth Layer Liquid Coating Composition: Uppermost layer) | |
| Silica Dispersion D2 | 660 ml |
| 10 percent aqueous solution of polyvinyl alcohol (PVA203, manufactured by Kuraray Co., Ltd.) | 5 ml |
| 6.5 percent aqueous solution of polyvinyl alcohol (at an average degree of polymerization of 3,800 and a saponification ratio of 88 percent) | 250 ml |
| 4 percent aqueous betaine type Surfactant 1 solution | 3 ml |
| 25 percent aqueous saponin solution | 2 ml |
| Ethanol | 3 ml |
| Pure water to make | 1000 ml |

Incidentally, the weight ratio of the cationic polymer (P-2) to the micro-particles of inorganic pigment (Aerosil 2000) was 1:6.9.

Betaine Type Surfactant 1

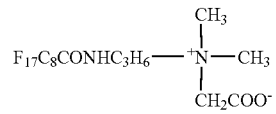

Each liquid coating composition prepared as above was filtered through a TCPD-30 filter with a filtration accuracy of 20 μm, manufactured by Advantex Toyo Co., Ltd. Thereafter, the resulting filtrate was filtered through a TCPD-10 filter.

(Coating)

Subsequently, the aforesaid four liquid coating compositions were simultaneously applied at 40° C. onto Paper Support 1 coated with polyethylene on both sides, while employing a slide hopper type coater to result in the wet layer thickness described below.

<Wet Layer Thickness>
First Layer: 42 μm
Second Layer: 39 μm
Third Layer: 44 μm
Fourth Layer: 38 μm Incidentally, Paper Support 1, employed as above, was prepared as follows. Polyethylene comprising anatase type titanium oxide in an amount of 6 percent was melt-extruded and applied onto the surface of photographic base paper of a basis weight of 170 g and a moisture content of 7 percent, to result in a polyethylene thickness of 35 μm, while polyethylene was melt-extruded and applied onto the rear surface to result in a thickness of 40 μm. The front surface side was subjected to corona discharge. Thereafter, polyvinyl alcohol (PVA235, manufactured by Kuraray Co., Ltd.) was applied onto the resulting surface to result in the coated weight of 0.05 g per $m^2$ of the recording media, whereby a sublayer was formed. Subsequently, the rear side was also subjected to corona discharge. Thereafter, onto the resulting surface was applied a back layer comprising approximately 0.4 g of a styrene-acrylic acid ester based latex binder, 0.1 g of an antistatic agent (being a cationic polymer), and 0.1 g of silica of approximately 2 μm particles as a matting agent.

After coating the ink absorptive layer liquid coating composition, the resulting coating passed thought a cooling zone maintained at 5° C. over 15 seconds to lower the layer surface temperature to 13° C. Thereafter, the coating was dried in a plurality of drying zones in which the temperature was suitably set and was wound in a roll, whereby Recording Medium 1 was prepared.

The cross-section surface of Recording Medium 1 was observed with microscope. The average diameter of silica micro-particles was measured to be 23 nm.

(Preparation of Recording Medium 2)

Recording Medium 2 was prepared in the same manner as aforesaid Recording Medium 1, except that the cationic polymer (P-2) employed in the fourth layer (the uppermost layer) was replaced with the cationic polymer (P-8) in the same amount.

The cross-section surface of Recording Medium 2 was observed with microscope. The average diameter of silica micro-particles was measured to be 22 nm.

(Preparation of Recording Medium 3)

Recording Medium 3 was prepared in the same manner as aforesaid Recording Medium 1, except that micro-particles of inorganic pigment (vapor phase method silica) employed in the fourth layer (the uppermost layer) were replaced with vapor phase method alumina (trade name: Aluminum Oxide C, of an average diameter of the primary particles of 13 nm, manufactured by Degussa Corp.) in the same amount.

The cross-section surface of Recording Medium 3 was observed with microscope. The average diameter of alumina micro-particles was measured to be 31 nm.

(Preparation of Recording Medium 4)

Recording Medium 4 was prepared in the same manner as aforesaid Recording Medium 1, except that the ratio of the cationic polymer (P-2) to micro-particles of inorganic pigment (vapor phase method silica) employed in the fourth layer (the uppermost layer) was varied to 1:4.0.

(Preparation of Recording Medium 5)

Recording Medium 5 was prepared in the same manner as aforesaid Recording Medium 1, except that Paper Support 1 was replaced with Paper Support 2 prepared by the method described below.

Seventy parts by weight of hardwood kraft pulp (LBKP) which was beaten to a Canadian Standard freeness of 330 ml, 25 parts by weight of hardwood bleached sulfite pulp (LBSP) which was beaten to a Canadian Standard freeness of 280 ml, and 5 parts by weight of softwood kraft pulp (NBKP) which was beaten to a Canadian Standard freeness of 280 ml were mixed, and the resulting mixture was further mixed while varying the rotation frequency of a double disk refiner, whereby pulp of a weight average fiber length of 1.20 mm was prepared. Added to 100 parts of each beaten pulp were 2.0 parts of cationic starch, 0.4 part of alkylketene dimer as a sizing agent, 0.1 part of an anionic polyacrylamide resin, and 0.7 part of polyamidopolyamine epichlorohydrin. The pH of the resulting mixture was adjusted to 7.5 by adding sodium hydroxide. Subsequently, 160 μm thick Paper Support 2 of a basis weight of 170 g was prepared employing a long-net paper machine.

(Preparation of Recording Medium 6)

Recording Medium 6 was prepared in the same manner as aforesaid Recording Medium 1, except that cationic polymer (P-2) employed in the fourth layer (being the uppermost layers) was eliminated.

<<Preparation of Aqueous Dye Ink>>

| (Preparation of Dye Ink 1) | |
|---|---|
| C.I. Direct Blue 199 | 3 weight percent |
| Diethylene glycol | 25 weight percent |
| Sodium dioctylsulfosuccinate | 0.01 weight percent |

The total volume was adjusted to 100 weight percent by adding water, whereby Dye Ink 1 was prepared.

(Preparation of Dye Inks 2–7)

Dye Inks 2–7 were prepared in the same manner as aforesaid Dye Ink 1, except that resinous micro-particles of each of those described in Table 1 was added to result in the content described in Table 1.

Resinous micro-particles used to prepare Dye Inks 2–7 are detailed below.

NLxA: nonionic resinous micro-particles (urethane resin, Superflex 500, MFT=5° C. at an average particle diameter of 140 nm, manufactured by Dia-Ichi Kogyo Seiyaku Co.)

NLxB: nonionic resinous micro-particles (acryl resin, Movinyl 730, MFT=0° C., at an average particle diameter of 120 nm, manufactured by Clariant Co.)

NLxC: nonionic resinous micro-particles (acryl resin, Nipol Lx816, Tg=–10° C. at an average particle diameter of 140 nm, manufactured by Zeon Corp.)

NLxD: nonionic resinous micro-particles (urethane resin, Superflex E-4000, MFT=5° C. at an average particle diameter=280 nm, manufactured by Dia-Ichi Kogyo Seiyaku Co.)

NLxE: nonionic resinous micro-particles (urethane resin, Takerac W-635, MFT=71° C. at an average particle diameter of 150 nm, manufactured by Takeda Chemical Industries Ltd.)

ALx1: anionic resinous micro-particles (urethane resin micro-particles, Superflex 130, MFT=55° C. at an average particle diameter of 42 nm, manufactured by Dia-Ichi Kogyo Seiyaku Co.)

The average diameter of each resinous micro-particle was determined employing a laser Doppler system Zeta Sizer 1000 (manufactured by Malvern Corp.).

on the formula described below. Gas fading resistance was then evaluated based on the criteria below.

Image residual ratio=density after exposure/density prior to exposure×100 (percent)

5: the image residual ratio was at least 95 percent
4: the image residual ratio was between 85 and 95 percent
3: the image residual ratio was between 70 and 85 percent
2: the Image residual ration was between 60 and 70 percent
1: the image residual ration was less than 60 percent

TABLE 1

| | | | Recording Medium | | | | | | | |
|---|---|---|---|---|---|---|---|---|---|---|
| | | | Composition of Uppermost Layer | | | Ink | | | | |
| Image No. | No. | Support | Polymer (A) | Minute Inorganic Particle (B) | A:B | No. | Minute Resinous Particle | Particle Diameter (nm) | MFT, Tg (° C.) | Content (weight %) | Remarks |
| 1 | 1 | *1 | P-2 | *3 | 1:5.6 | 2 | NLxA | 140 | 5 | 2.0 | Inv. |
| 2 | 1 | *1 | P-2 | *3 | 1:5.6 | 3 | NLxB | 120 | 0 | 2.0 | Inv. |
| 3 | 1 | *1 | P-2 | *3 | 1:5.6 | 4 | NLxC | 140 | −10 | 2.0 | Inv. |
| 4 | 1 | *1 | P-2 | *3 | 1:5.6 | 5 | NLxD | 280 | 5 | 2.0 | Inv. |
| 5 | 1 | *1 | P-2 | *3 | 1:5.6 | 6 | NLxE | 150 | 71 | 2.0 | Inv. |
| 6 | 2 | *1 | P-8 | *3 | 1:5.6 | 3 | NLxB | 120 | 0 | 2.0 | Inv. |
| 7 | 3 | *1 | P-2 | *4 | 1:5.6 | 3 | NLxB | 120 | 0 | 2.0 | Inv. |
| 8 | 4 | *1 | P-2 | *3 | 1:4.0 | 3 | NLxB | 120 | 0 | 2.0 | Inv. |
| 9 | 5 | *2 | P-2 | *3 | 1:5.6 | 3 | NLxB | 120 | 0 | 2.0 | Inv. |
| 10 | 1 | *1 | P-2 | *3 | 1:5.6 | 1 | — | — | — | — | Comp. |
| 11 | 1 | *1 | P-2 | *3 | 1:5.6 | 7 | ALx1 | 42 | 55 | 2.0 | Comp. |
| 12 | 6 | *1 | — | *3 | — | 2 | NLxB | 120 | 0 | 2.0 | Comp. |

*1; non-water absorptive
*2; water absorptive
*3; vapor phase method silica
*4; vapor phase method alumina
Inv.; Present Invention
Comp.; Comparative Example <<Formation of Ink Jet Images>>

Each of Dye Inks 1–7, prepared as above, was placed in a cartridge installed in printer MJ800C manufactured by Seiko Epson Corp. Subsequently, solid images and narrow lines of a width of 720 dpi (dpi as described in the present invention refers to the number of dots per inch or 2.54 cm) equivalent to one pixel were printed while combined with each recording medium described in Table 1, whereby Images 1–12 were outputted.

<<Measurement and Evaluation of Ink Jet Images>>

Cyan images, formed as above, were measured and evaluated based on the methods described below.

(Evaluation of Gas Fading Resistance)

Each solid image was placed in an ambience of an ozone concentration of 50 ppm at 23° C. for 120 minutes. Thereafter, reflecting density prior to and after exposure to ozone was determined under red monochromatic light, employing an optical densitometer (X-Rite 938, manufactured by X-Rite Inc.), and a residual image ratio was obtained based (Evaluation of Glossiness)

Image clarity (glossiness value in C value percent) of each solid image, prepared as above, was determined at a reflection of 60 degrees and an optical comb of 2 mm, employing an image clarity measurement apparatus ICM-IDP (manufactured by Suga Shiken Kikai Co.). Evaluation was carried out based on the criteria below.

4: C value percent was at least 71
3: C value percent was 70–56
2: C value percent was 55–41
1: C value percent was at most 40

(Evaluation of Bleeding Resistance)

Bleeding resistance was evaluated as follows. Each of the narrow line images, prepared as above, was stored in a hydrothermostat maintained at 60° C. and 80 percent relative humidity for 7 days. Subsequently, according to the criteria below, 20 evaluators visually evaluated the change of narrow lines prior to and after the aforesaid storage, while comparing them to samples stored at normal temperature and normal humidity.

A: at least 16 evaluators evaluated that no change occurred between prior to and after storage
B: 12–15 evaluators evaluated that no change occurred between prior to and after storage
C: 8–11 evaluators evaluated that no change occurred between prior to and after storage
D: At most 7 evaluators evaluated that no change occurred between prior to and after storage Obtained evaluation results were listed in Table 2.

(Evaluation of Ink Absorbing Property)

Solid cyan color images were prepared with an ink ejection amount of 20 ml/m². The combination of Recording Media and Inks were listed in Table 1. The ink absorbing property was evaluated by visual check using the criteria described below.
5: Completely uniform solid image
4: Uniform when observed in a distance of at least 20 cm
3: Uniform when observed in a distance of at least 40 cm
2: Uniform when observed in a distance of at least 60 cm
1: Non-uniform when observed even in a distance of at least 60 cm aqueous dye ink comprising nonionic resinous micro-particles, water-soluble dyes, water, and organic solvents. Further, it can be seen that by employing silica on the uppermost layer of recording media and controlling the ratio of the cationic polymers to the inorganic micro-particles to the specified range, or employing a non-water absorptive support as a support, the effects of the present invention were more strongly exhibited. Still further, it can be seen that by employing anionic resinous micro-particles of the specified average diameter, or MFT or Tg in the ink, the effects of the present invention were still more strongly exhibited.

Example 2

Employing the same method as Example 1, images were printed under the same embodiments while replacing Dye Inks 1–7 as a cyan in (C) with yellow ink (Y), magenta ink (M), and black ink (K) and were then evaluated in the same manner as above. With each ink, it was possible to obtain the same results as the cyan ink in Example 1.

TABLE 2

| | | Recording Medium | | | Ink | | | | | | | |
|---|---|---|---|---|---|---|---|---|---|---|---|---|
| | | | Composition of Uppermost Layer | | | | | | | | | |
| Image No. | No. | Support | Polymer | Inorganic micro-particle | No. | Resinous micro-Particle | Type | Gas Fading Resistance | Glossiness (C value) | Bleeding Resistance | Ink Absorbing ability | Remark |
| 1 | 1 | *1 | P-2 | *3 | 2 | SF500 | *Self | 5 | 4 | A | 5 | Inv. |
| 2 | 1 | *1 | P-2 | *3 | 3 | Movinyl 730 | *Forced | 5 | 4 | A | 3 | Inv. |
| 3 | 1 | *1 | P-2 | *3 | 4 | Lx816 | *Forced | 4 | 4 | A | 3 | Inv. |
| 4 | 1 | *1 | P-2 | *3 | 5 | SF E 4000 | *Forced | 3 | 3 | B | 5 | Inv. |
| 5 | 1 | *1 | P-2 | *3 | 6 | W-635 | *Self | 3 | 4 | A | 3 | Inv. |
| 6 | 2 | *1 | P-8 | *3 | 3 | Movinyl 730 | *Forced | 5 | 4 | A | 3 | Inv. |
| 7 | 3 | *1 | P-2 | *4 | 3 | Movinyl 730 | *Forced | 3 | 3 | B | 3 | Inv. |
| 8 | 4 | *1 | P-2 | *3 | 3 | Movinyl 730 | *Forced | 3 | 4 | A | 3 | Inv. |
| 9 | 5 | *2 | P-2 | *3 | 3 | Movinyl 730 | *Forced | 5 | 3 | A | 3 | Inv. |
| 10 | 1 | *1 | P-2 | *3 | 1 | — | — | 1 | 1 | D | 5 | Comp. |
| 11 | 1 | *1 | P-2 | *3 | 7 | SF 130 | — | 2 | 1 | C | 1 | Comp. |
| 12 | 6 | *1 | — | *3 | 2 | Movinyl 730 | *Forced | 2 | 2 | C | 4 | Comp. |

*1; non-water absorptive
*2; water absorptive
*3; vapor phase method silica
*4; vapor phase method alumina
Inv.; Present Invention
Comp.; Comparative Example
*Self; Self-dispersed emulsion
*Forced; Forced emulsion As can clearly be seen from Table 2, images of the present invention, prepared as below, resulted in minimal gas fading, and exhibited higher glossiness and better bleeding resistance compared to comparative images. The aforesaid images were formed on recording media on which the uppermost layer was comprised of micro-particles of inorganic pigment as well as cationic polymers, employing an Example 3

Eight colored inks consisting of four Y, M, C, and K color inks and four pale colored inks (Ly, Lm, Lc and Lk), which were prepared by decreasing the addition amount of water-soluble dye in each ink to ¼ were installed in an ink jet printer (IGUAZU 1044SD, manufactured by Konica Corp.), and images were printed on Recording Medium 1 prepared in Example 1. As a result, it was possible to prepare excellent images which exhibited desired gas fading resistance, glossiness, and bleeding resistance.

Based on the present invention, it is possible to provide an ink jet recording method which results in excellent gas fading resistance, high glossiness, and excellent bleeding resistance.

What is claimed is:

1. A method for printing an ink-jet image, comprising the steps of:

ejecting droplets of an ink containing nonionic resinous micro-particles having an average particle diameter of 50 to 150 nm, a water-soluble dye, water and an organic solvent on an ink-jet recording media; and forming a film as a gas barrier layer including the nonionic resinous micro-particles on the surface of the ink-jet recording media, wherein the ink-jet recording media contains a support having thereon at least one ink absorbing layer and the outermost structure containing a cationic polymer and inorganic pigment micro-particles.

* * * * *